US011394715B2

(12) United States Patent
Lu et al.

(10) Patent No.: US 11,394,715 B2
(45) Date of Patent: *Jul. 19, 2022

(54) PROXY AUTHORIZATION OF A NETWORK DEVICE

(71) Applicant: Dropbox, inc., San Francisco, CA (US)

(72) Inventors: Yuran Lu, San Francisco, CA (US); Rong Zhao, Foster City, CA (US); James Harvey, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 16/710,831

(22) Filed: Dec. 11, 2019

(65) Prior Publication Data

US 2020/0120104 A1    Apr. 16, 2020

Related U.S. Application Data

(63) Continuation of application No. 14/807,984, filed on Jul. 24, 2015, now Pat. No. 10,542,008.

(51) Int. Cl.
*H04L 29/06* (2006.01)
*H04L 9/40* (2022.01)
(52) U.S. Cl.
CPC ........ *H04L 63/102* (2013.01); *H04L 63/0884* (2013.01); *H04L 63/0807* (2013.01)

(58) Field of Classification Search
CPC ............... H04L 63/102; H04L 63/0884; H04L 63/0807
See application file for complete search history.

(56) References Cited

U.S. PATENT DOCUMENTS

| 9,323,916 | B1* | 4/2016 | Wu | H04L 63/126 |
| 2014/0282921 | A1* | 9/2014 | Filman | G06F 21/57 |
| | | | | 726/5 |
| 2014/0310769 | A1* | 10/2014 | O'Neill | H04L 9/3213 |
| | | | | 726/1 |
| 2016/0062623 | A1* | 3/2016 | Howard | G06F 3/016 |
| | | | | 715/788 |

OTHER PUBLICATIONS

Notice of Allowance from U.S. Appl. No. 14/807,984, dated Oct. 9, 2019, 13 pages.

* cited by examiner

*Primary Examiner* — Noura Zoubair
(74) *Attorney, Agent, or Firm* — Polsinelli PC

(57) ABSTRACT

Some methods enable a first device to assist a second device in becoming authenticated with a content management system. The content management system can receive user credentials or an elevated access token from the first device. The content management system can respond to the first device with an access token for use by the second device. Alternatively, the content management system can send the access token directly to the second device. The second device can then use the access token for authenticated communications with the content management system.

20 Claims, 5 Drawing Sheets

PROXY AUTHORIZATION OF A NETWORK DEVICE

CROSS-REFERENCE TO RELATED APPLICATIONS

This application is a continuation of U.S. application Ser. No. 14/807,984, filed on Jul. 24, 2015, entitled, PROXY AUTHORIZATION OF A NETWORK DEVICE, which is hereby expressly incorporated herein by reference in its entirety.

BACKGROUND

Many electronic devices can benefit from being connected to a content management system. Typically, these connections require the electronic device to present user credentials in order to authorize the connection. However, many electronic devices only have limited interactivity. For example, a device may only have a few buttons or have no display. This presents challenges for a user attempting to input their credentials.

Current approaches include requiring a user to use a few buttons to navigate a collection of characters, gradually entering in the user's credentials character by character. This approach is laborious and error-prone.

The foregoing limitations can severely limit the ability of an electronic device to connect to a content management system.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for one device assisting a second device in establishing a validated connection with a content management system.

A first device can assist a second device in establishing a validated connection with a content management system. The second device might have limited interactivity or it might be inconvenient for a user to input credentials into the second device. The first device can send a request for an access token to the content management system. The request can include an identifier of the second device such as a serial number. This access token can be associated with a user account on the content management system as well as the second device.

The content management system can then generate an access token and send it directly to the second device or send it to the first device, which can retransmit it to the second device. The second device can then use the access token for an authenticated communication with the content management system so that it can send and receive data associated with the user account.

BRIEF DESCRIPTION OF THE DRAWINGS

The above-recited and other advantages and features of the disclosure will become apparent by reference to specific embodiments thereof, which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for one device to assist a second device in establishing a validated connection with a content management system. Some devices have limited interactive capabilities while others have characteristics that otherwise make it inconvenient for a user to enter in their credentials on the device. Because of this, it can be advantageous for a user to provide their credentials to another device with more convenient interactive capabilities, which can then assist the device with limited interactivity in commencing an authenticated connection with the content management system. Depending on implementation choices, one device can store a user's credentials and thus assist multiple devices in commencing the authenticated connection without the user repeatedly entering in their credentials.

Figure 1:
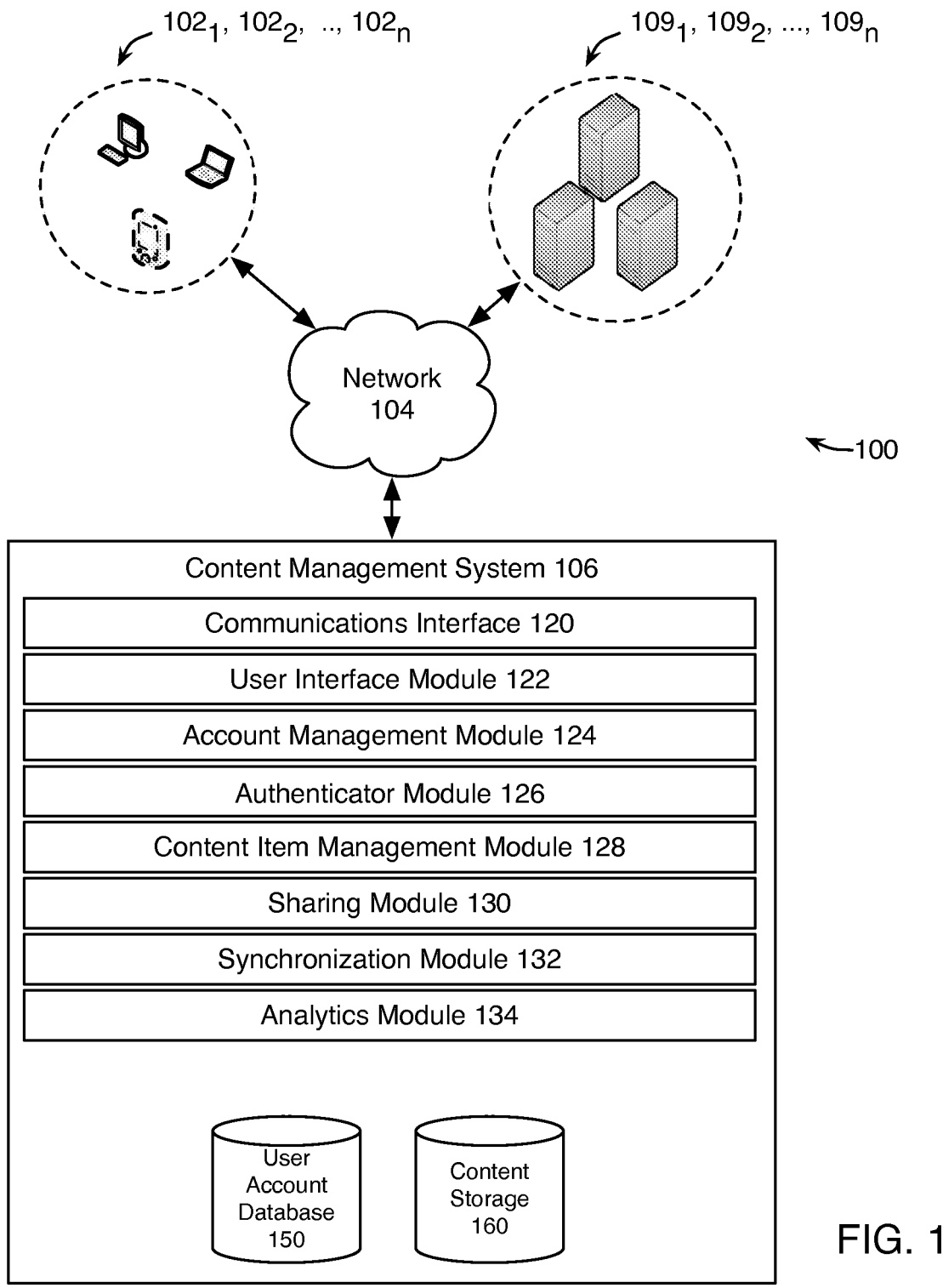
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions;

set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102, and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device 102, may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
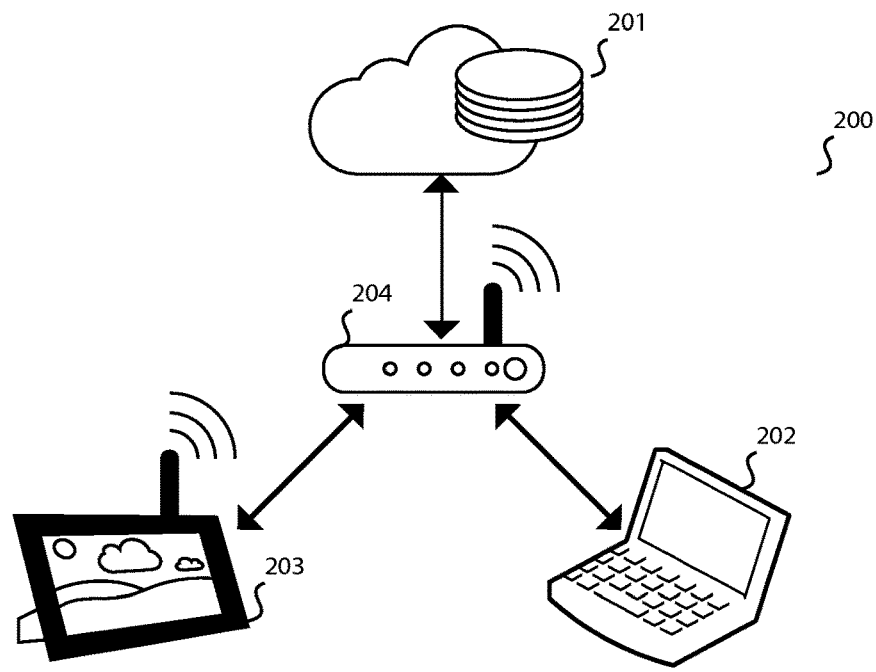
FIG. 2 shows an example configuration of devices in accordance with some embodiments.

FIG. 2 shows an example configuration 200 according to some embodiments.

Router 204 can be connected to content management system 201 (e.g., content management system 106 in FIG. 1), first electronic device 202 (e.g., client device $102_1$ in FIG. 1), and second electronic device 203 (e.g., client device $102_2$ in FIG. 1). It should be understood that the principles herein disclosed are effective on alternative network topologies. For example, first electronic device 202 can be connected directly to second electronic device 203. In another example embodiment, first and second electronic devices can be connected to content management system 201 by different routers, switches, access points, the internet, etc. In some embodiments, first electronic device 202 and second electronic device 203 are located on the same local area network (LAN), subnet, workgroup, switch, virtual LAN, user space, etc. In some embodiments, first electronic device 202 and/or second electronic device 203 are virtual machine instances running on a server. Connections between entities can be wireless (e.g., Bluetooth, 802.11x, Zigbee, LTE, infrared, etc.), wired (e.g., Ethernet, USB, TWI, serial, coaxial, etc.), or a combination of the two. Although "electronic devices" are described herein, it should be understood that other types of computational devices such as mechanical or biological computational mechanisms can be equally effective.

In some embodiments, first electronic device 202 is interactive. For example, first electronic device 202 can receive user input via a touchscreen, touchpad, keyboard, mouse, smart card reader, biometric sensor, camera, etc. In some embodiments, first electronic device 202 can present information via a touchscreen, a monitor, speakers, etc. In some embodiments, first electronic device 202 has a connected interface such as a web-based interface whereby a user can interact with first electronic device 202. In some embodiments, first electronic device 202 can be a portable electronic device (such as a mobile phone, tablet, watch, etc.), computer (such as a laptop or desktop), network device (such as a switch or router), etc.

In some embodiments, second electronic device 203 is similarly interactive; alternatively, second electronic device 203 can have limited interactive capabilities in comparison to first electronic device 202. For example, second electronic device 203 might only have power and navigational buttons, which can render configuration and setup difficult. In another example embodiment, second electronic device 203 has limited capabilities of displaying information. For example, second electronic device 203 may only have a few status indicator lights but not a full display. In some embodiments, second electronic device 203 has similar or greater intractability as first electronic device 202. In some such embodiments, the principles herein disclosed can facilitate fast and simple authentication of second electronic device 203, despite second electronic device 203 not having user access constraints. In some embodiments, size, proximity, processing power, or other access constraints hinder user interaction with second electronic device 203. Non-limiting examples of second device can include a digital picture frame, digital camera, security camera, music player, fitness tracker, television, set-top box, watch, mobile phone, tablet, printer, scanner, etc.

Figure 3:
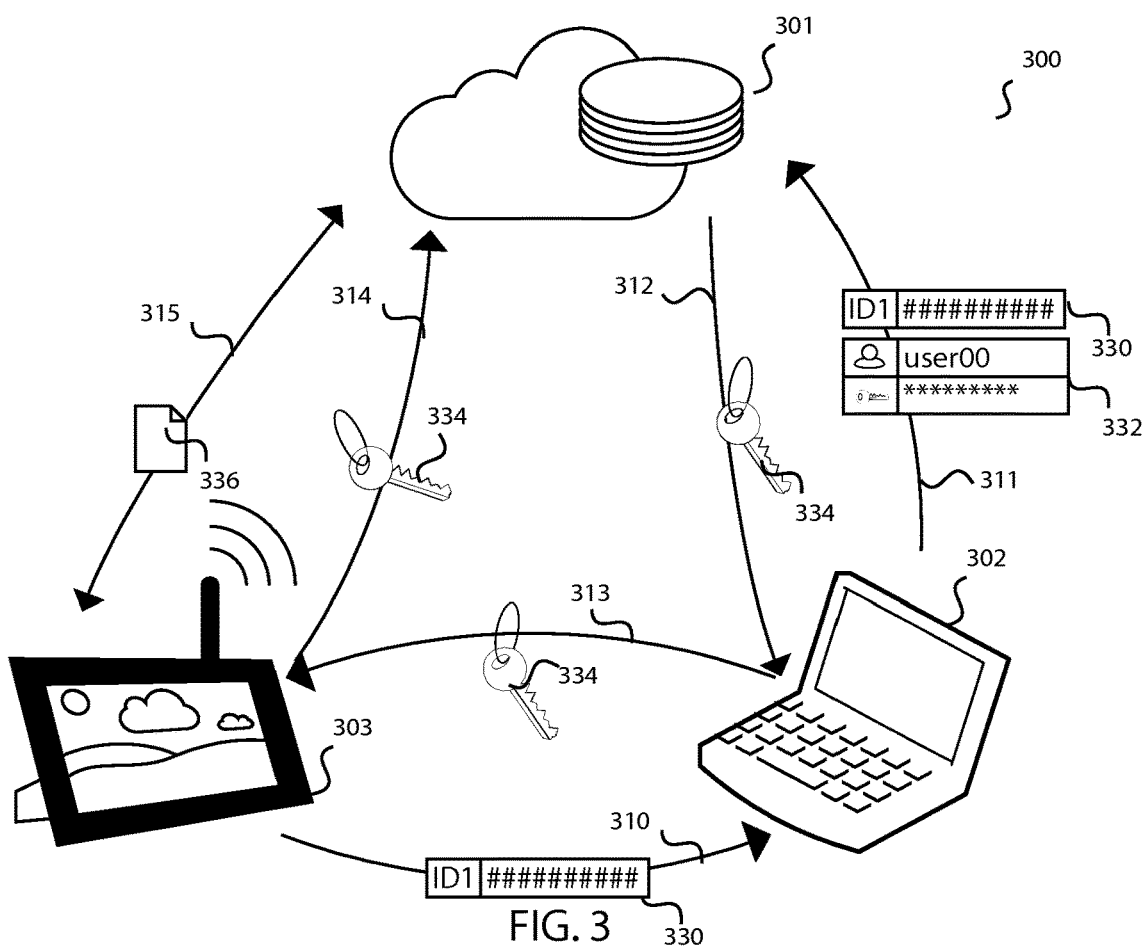
FIG. 3 shows an example data flow between devices.

FIG. 3 shows example data flow 300 between first electronic device 302, second electronic device 303 and content management system 301. First electronic device 302, second device 303 and content management system 301 correspond to first electronic device 202, second device 203 and content management system 201 as described in FIG. 2. In FIG. 3, first electronic device 302 assists second electronic device 303 with connecting to content management system 301. In some embodiments, devices can programmatically access data stored on content management system 301 via an API. Many APIs require a user to authenticate a device or program using user credentials 332; the API can validate user credentials 332 and generate access token 334 for use by the program, device, or session. The program or device can then use access token 334 as credentials for future interactions with content management system 301. Using this approach, the program or device does not store user credentials 332, only its access token 334. If the program or device is compromised, content management system 301 can revoke the privileges of access token 334 without affecting other devices or requiring the user to change their password. In example data flow 300 in FIG. 3, first electronic device 302 sends (311) user credentials 332 to content management system 301 and receives (312) access token 334 in return; first electronic device then sends (308) access token 334 to second electronic device 303. This enables second electronic device 303 to send (314) access token 334 to content management service 301 and engage in authenticated API data transfer (315).

In some embodiments, access token 334 can be associated with one or more user accounts; for example, it can be associated with a group or class of users. In some embodiments, access token 334 can be associated with a folder or collection such that the bearer of the access token can access the folder or collection. This access can have limited permissions such as read-only or write-only.

In some embodiments, access token 334 has no access privileges and is only used for authentication, much like the OAuth standard whereby one service can validate a user's identity for another service. For example, the other service may be a third party service that requires its users to sign in via content management service 301 ("first party service"). There is a variety of motivations for this requirement. For example, third party service might anticipate that users might not want to register specifically for third party service because creating and remembering this new registration information might be inconvenient for the user. In addition, the third party service might want to discourage users from having duplicate accounts with the third party service: if users generally only have a single account with the first party service then a user wishing to have multiple third party service accounts would be required to also create multiple first party service accounts. The first party service might also be better equipped to prevent duplicate account creation, malicious account creation, or fraudulent account creation. In these scenarios, second electronic device 303 can provide access token 334 to third party service which can then send access token 334 to content management service 301. Content management service 301 can validate access token and provide an identifier associated with user account to third party service as authentication. Alternatively, second electronic device 303 can provide access token 334 to content management service 301 and content management service 301 creates a third party access token. Second electronic device 303 can then send third party access token to the third party service which can use third party access token to verify the identity of second electronic device 303 with content management service 301.

In some embodiments, second electronic device 303 initiates (310) a data flow process. For example, second electronic device 303 can request access token 334 from first electronic device 302. Alternatively, first electronic device 302 can poll local devices (devices on the same network) to determine if any devices on the network need access token 334. In some embodiments, a user initiates example data flow 300. For example, the user can indicate, on first electronic device 302 or content management system 301, that second electronic device 303 needs access token 334. In some embodiments, communication between second electronic device 303 and first electronic device 302 is encrypted using a pre-shared key. For example, one device can provide the user with a key (access code, serial number, etc.) that the user can enter on the other device, thus "pre-sharing" the key. In some embodiments, a user can indicate on both first electronic device 302 and second electronic device 303 that second electronic device 303 needs access token 334; by so indicating on both devices, the user initiates example data flow 300 while simultaneously authorizing first electronic device 302 to trust second electronic device 303.

First electronic device 302 can send (311) user credentials 332 to content management system 301. User credentials 332 can include a username and a password. Alternatively, user credentials 332 can be an access token that content management system 301 previously generated and sent to first electronic device 302. In some embodiments, first electronic device 302 also sends second electronic device identifier 330. Second electronic device identifier 330 can enable content management system 301 to associate second electronic device 303 with access token 334. Second electronic device identifier can be second device 303's MAC address, serial number, a random number, etc. In some embodiments, second electronic device identifier 330 is a user-provided description or label. In some embodiments, second electronic device 303 sends second electronic device identifier 330 to first electronic device 302 while initiating (310) example data flow 300.

Content management system 301 can then generate access token 334. Content management system 301 can generate access token by hashing second electronic device identifier 330 or some other technique known in the art. Access token 334 can provide authorization of the "bearer" (i.e., the device or program that presents access token 334) to interact with content management system 301 on behalf of a user without storing or having access to user credentials 332; specifically, access token 114 can allow a device to interact with content management system 301's APIs. This technique enables a user to grant a device or program access privileges to the user's account, without providing the user's username and password. The access privileges can be complete or limited in scope. For example, access privileges can be read-only, limited to a specific collection, or only last for a limited duration. In some embodiments, access token 334 is associated with a specific device (e.g., content management system 301 can associate access token 334 with second electronic device identifier 330). If the user wishes to create access tokens for multiple devices, each device can have a unique access token, thus enabling a user to later invalidate or modify an access token's privileges for one device without affecting the access policies of the other devices. Alternatively, various devices can share the same access token 334.

Content management system 301 can then send access token 334 to first electronic device 302. First electronic device 302 can then send access token 334 to second electronic device 303. Alternatively, content management system 301, can send access token 334 to second electronic device 303 more directly, without using first electronic device 302 as an intermediary. In some embodiments, first electronic device 302 maintains a record of access token 334 and associates it with second electronic device 303.

Second electronic device 303 can then use access token 334 to connect to content management system 301. For example, second electronic device 303 can send access token 334 to content management system 301 as part of an API session and request data 336 from content management system 301. Content management system 301 can then validate access token 334 and send the requested data 312 to second electronic device 303. In some embodiments, requested data 336 is a picture, video, document, file, data stream, etc. In some embodiments, second electronic device 303 sends data to content management system 301 instead of or in addition to requesting data. In some such embodiments, data 336 can be a recording of activity relevant to second electronic device 303, such as a data log, pictures, video, etc.

It should be understood that communications herein described generally represent only the source and destination of a given communication; the actual path that data takes is dependent on the network topology. For example, communication 311 between first electronic device 302 and content management system 301 can include sending data through router 204. Further, communications between entities can be encrypted using techniques known in the art.

Figure 4:
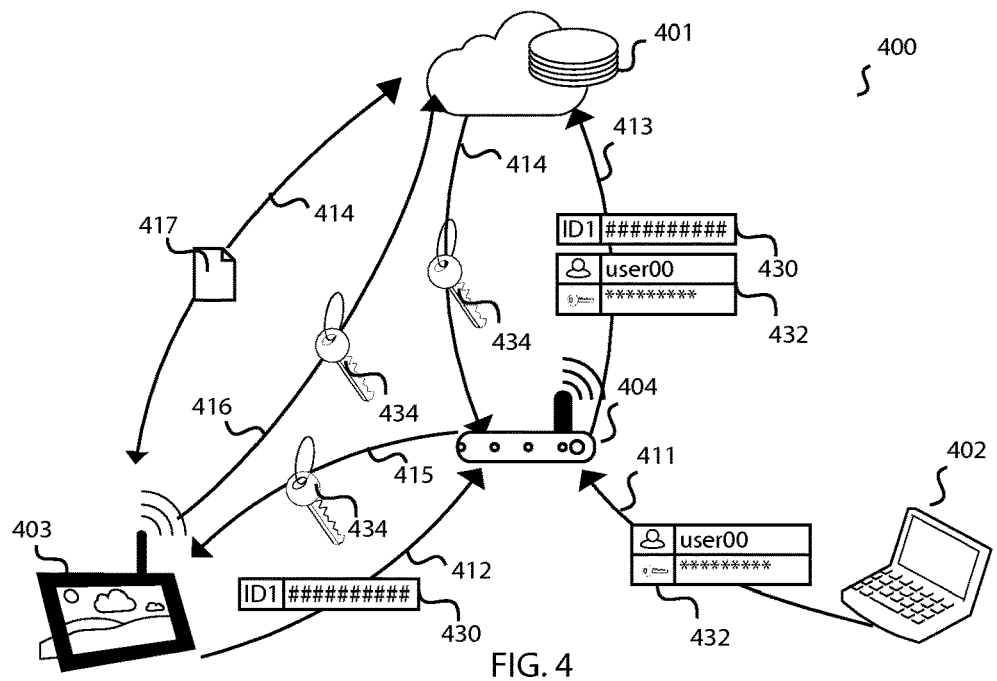
FIG. 4 shows an example data flow between devices.

FIG. 4 shows an example data flow 400 between various devices. Data flow 400 can be similar to data flow 300; some of the differences will now be highlighted. For example, in data flow 400, router 404 can facilitate many functions done by second electronic device 403 as presented in data flow 300. For example: router 404 can receive (412) second electronic device identifier 430; it can send (413) user credentials 432 and second electronic device identifier 430 to content management system 401; and it can receive (434) access token 434 from content management system 401 and forward (415) access token 434 to second electronic device 403. Second electronic device 403 can then, using access token 434, connect to content management system 401 to send and receive data 417.

Data flow 400 further shows how first electronic device 402 can provide (411) user credentials 432 to router 404. For example, a user could enter user credentials 432 on first electronic device 402 which can then send them to router 404. Thus, configured router 404 is able to acquire access token 434 for second electronic device 403 (and future access tokens for other devices) without further input from first electronic device 402.

Similar to example data flow 300, a user can indicate on both second electronic device 403 and router 404 that second electronic device 403 needs, and is authorized to receive, access token 434. For example, the user may press a button on each device within a predetermined period of time. If first electronic device 402 has previously sent (411) user credentials 432 to router 404, then router 404 can request (413) and receive (414) access token 434 from content management system 401 and forward (415) access token 434 to second electronic device 403.

Figure 5:
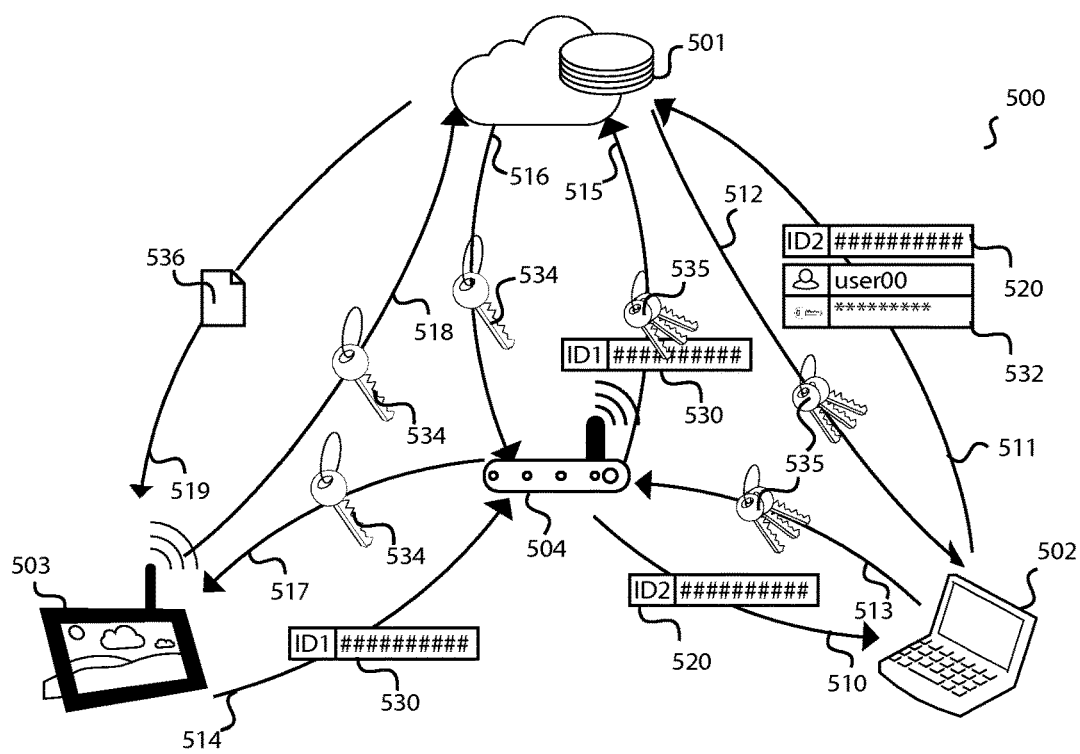
FIG. 5 shows an example data flow between devices.

FIG. 5 shows an example data flow 500 between various devices. Data flow 500 is a blended approach, combining some elements of example data flow 400 with example data flow 300 and some additional elements. In some embodiments, router 504 can send (510) router identifier 520 to first electronic device 502. First electronic device can then send (511) access credentials 532 and, in some embodiments, router identifier 520 to content management system 501 as part of a request for elevated access token 535.

Content management system 501 can then validate user credentials 532 and generate elevated access token 535. In some embodiments, content management system 501 can use elevated access token 535 to generate other access tokens as if elevated access token 535 were user credentials 532. For example, router 504 can send elevated access token 535 with a request for access token 534 to content management system 501. Content management system 501 can then validate elevated access token 535 and generate access token 534. In some embodiments, router 504 can send (515) second electronic device identifier 530 along with the request, content management system 501 can then associate second electronic device identifier 530 with second electronic device 503. Elevated access token 535 can be similar in functionality to access token 534. Content management system 501 can associate elevated access token 535 with router identifier 520 (and router 504) and access token 534 that is generated using elevated access token 535's credentials (these could be considered "child access tokens" of elevated access token 535). Configured as such, content management system 501 can modify elevated access token 535's privileges and the child access tokens will simultaneously have their privileges reflect the modifications.

In some embodiments, content management system 501 can present a user with the devices (e.g., second electronic device 503) that are associated with elevated access token 535 or access token 334. Because elevated access token 535 or access token 334 (collectively, "tokens") can be associated with various privileges, content management system 501 can also present a user with the privileges associated with a token. A user can then modify or revoke the privileges associated with a token. Responses from content management system 501 can be dependent on the privileges of the token making the request. For example, content management system 501 can reject a request to upload a file if the requesting device's token has been revoked.

In some embodiments, second electronic device 503 and first electronic device 502 are not in communication with each other. Rather, first electronic device 502 can communicate user credentials 532 and second electronic device identifier 530 to content management system 501. Second electronic device 503 can also communicate second electronic device identifier 530 to content management system 501. After validating user credentials 532, content management system 501 can compare the second electronic device identifier 530 supplied by first electronic device 502 and second electronic device 503; if there is a match, then content management system 501 can validate second electronic device 503. In some embodiments, content management system 501 generates access token 534 for second electronic device 503 to use for authenticated communications.

Using access token 534 can facilitate migration of second electronic device 503 to another user account. For example, if a first user submits first user credentials for registering second electronic device 503 with the first user's account, the content management system can generate a first access token; if content management system subsequently receives a request from a second user attempting to register second electronic device 503 with the second user's account, content management system 501 can invalidate the first access token and generate a second access token associating second electronic device 503 with the second user's account.

Figure 6:
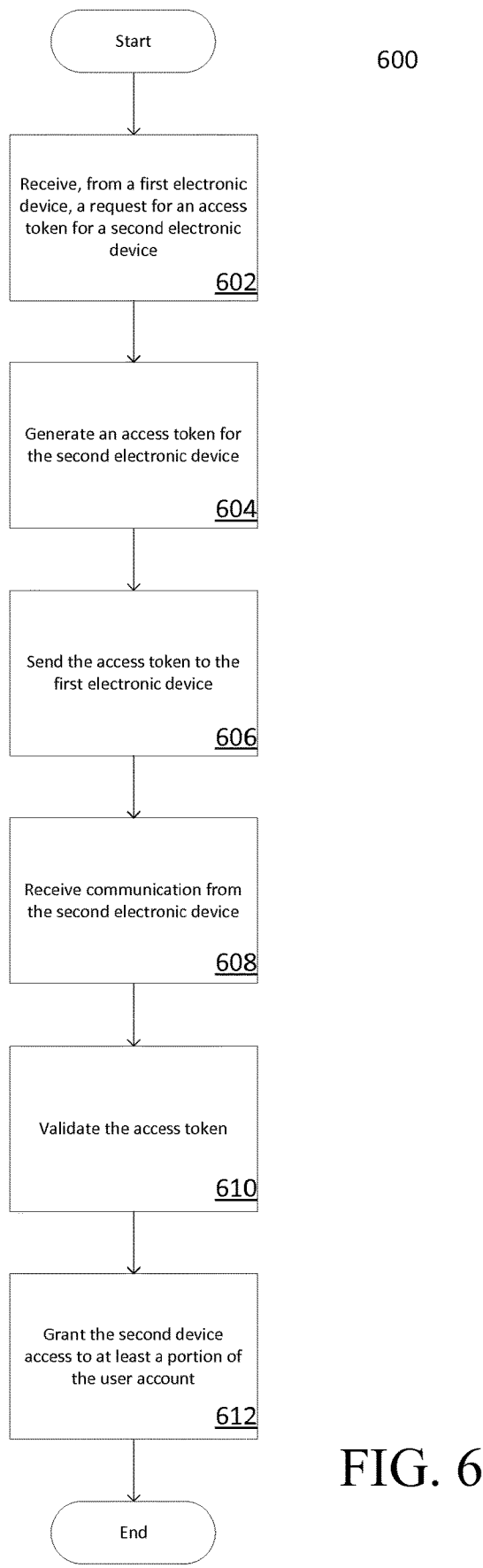
FIG. 6 shows an example flowchart in accordance with some embodiments

FIG. 6 shows an example method 600 describing some embodiments of the present disclosure from the context of content management system 201. First, content management system 201 can receive, from a first electronic device, a request for an access token for a second electronic device (602). The access token can be associated with a user account of the synchronized content management system. In some embodiments, the request occurs over the internet. Next, the content management system can generate an access token for the second electronic device (604). In some embodiments, the access token can be randomly generated. The access token can be associated with the user account.

The next step in the example method includes sending the access token to the first electronic device (606). The first electronic device can then communicate the access token to the second device. In some embodiments, the content management system facilitates the first electronic device communicating the access token to the second electronic device (e.g., by forwarding data or providing connection information); alternatively, the communication between the first and second electronic device can occur without such assistance.

The content management system can then receive a communication from the second electronic device (608). This communication can be a request for data or a submission of data. For example, the second electronic device may wish to retrieve photos stored on the user's account or submit photos for storage on the user's account. In some embodiments, the communication uses an API for communication. The request can include the access token that was previously sent to the first electronic device. The content management system can then validate the access token (610). Validation can include comparing the access token to a database on the content management system and determining privileges associated with the access token and the user account. For example, the access token can permit the bearer of the access token to have read-only access to a collection of files in the user account. The content management system can then grant the second device access to at least a portion of the user account (612). Granting access can include sending data stored in the user account as well as storing data in the user account.

Figure 7A:
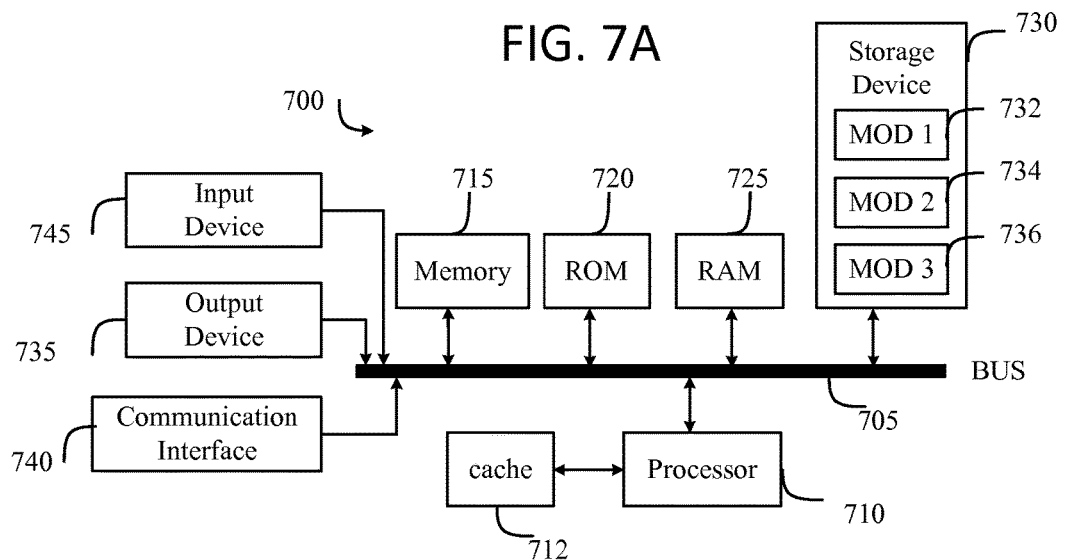
FIG. 7A shows an example possible system embodiment for implementing various embodiments of the present technology.
Figure 7B:
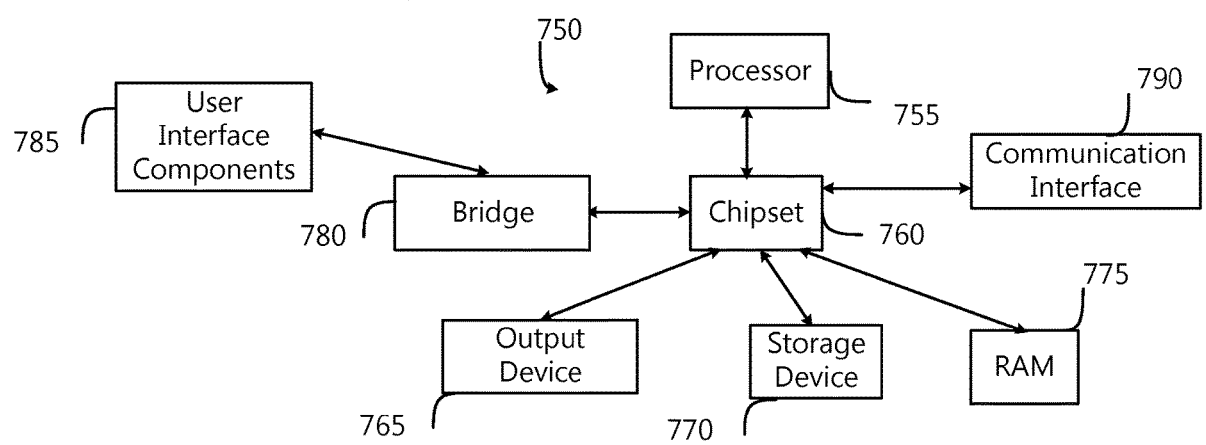
FIG. 7B shows an example possible system embodiment for implementing various embodiments of the present technology.

7A and FIG. 7B show example system embodiments. Persons of ordinary skill in the art will also readily appreciate that other system embodiments are possible.

FIG. 7A illustrates a conventional system bus computing system architecture 700 wherein the components of the system are in electrical communication with each other using a bus 705. Example system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   receiving, by a synchronized content management system, an elevated access token from a network device and a request for a child access token for an electronic device, wherein the elevated access token is associated with one or more access privileges associated with content of a user account of the synchronized content management system and enables the network device to independently authorize child access tokens for other electronic devices;
   validating the elevated access token;
   generating the child access token for the electronic device, wherein the child access token is associated with the elevated access token at the synchronized content management system; and
   after generating the child access token, modifying, by the synchronized content management system, the one or more access privileges of the elevated access token, wherein modifying the one or more access privileges of the elevated access token simultaneously modifies access privileges granted to the child access token and changed by the modification to the one or more access privileges of the elevated access token.

2. The computer-implemented method of claim 1, further comprising:
   receiving, by the synchronized content management system, access credentials and a network device identifier to request the elevated access token;
   generating the elevated access token; and
   sending the elevated access token to the network device prior to receiving the request for the child access token from the network device.

3. The computer-implemented method of claim 1, further comprising:
   receiving a first electronic device identifier along with the request for the child access token for the electronic device from the network device;
   receiving a second electronic device identifier from the electronic device; and
   determining a match between the first and second electronic device identifiers before generating the child access token for the electronic device.

4. The computer-implemented method of claim 1, wherein modifying the one or more access privileges includes revoking a privilege to upload content items to the synchronized content management system.

5. The computer-implemented method of claim 1, wherein the elevated access token is used for authentication to validate an identity of a user for a third-party service.

6. The computer-implemented method of claim 1, wherein the network device is a router.

7. The computer-implemented method of claim 1, further comprising:
   sending the child access token directly to the electronic device.

8. A system comprising:
   one or more processors;
   at least one computer readable medium; and
   computer readable instructions, stored on the at least one computer readable medium, that when executed by the one or more processors cause the system to:
   receive, by a synchronized content management system, an elevated access token from a network device and a request for a child access token for an electronic device, wherein the elevated access token is associated with one or more access privileges associated with to content of a user account of the synchronized content management system and enables the network device to independently authorize child access tokens for other electronic devices;
   validate the elevated access token;
   generate the child access token for the electronic device, wherein the child access token is associated with the elevated access token at the synchronized content management system; and
   after generating the child access token, modifying, by the synchronized content management system, the one or more access privileges of the elevated access token, wherein modifying the one or more access privileges of the elevated access token simultaneously modifies access privileges granted to the child access token and changed by the modification to the one or more access privileges of the elevated access token.

9. The system of claim 8, wherein the instructions are further executable to:
   receive, by the synchronized content management system, access credentials and a network device identifier to request the elevated access token;
   generate the elevated access token; and
   send the elevated access token to the network device prior to receiving the request for the child access token from the network device.

10. The system of claim 8, wherein the instructions are further executable to:
    receive a first electronic device identifier along with the request for the child access token for the electronic device from the network device;
    receive a second electronic device identifier from the electronic device; and
    determine a match between the first and second electronic device identifiers before generating the child access token for the electronic device.

11. The system of claim 8, wherein modifying the one or more access privileges includes revoking a privilege to upload content items to the synchronized content management system.

12. The system of claim 8, wherein the elevated access token is used only for authentication to validate a user's identify for a third-party service.

13. A non-transitory computer-readable medium storing computer executable instructions that, when executed by one or more processors, cause a computing device to:
    receive, by a synchronized content management system, an elevated access token from a network device and a request for a child access token for an electronic device, wherein the elevated access token is associated with one or more access privileges associated with to content of a user account of the synchronized content management system and enables the network device to independently authorize child access tokens for other electronic devices;

validate the elevated access token;

generate the child access token for the electronic device, wherein the child access token is associated with the elevated access token at the synchronized content management system; and after generating the child access token, modifying, by the synchronized content management system, the one or more access privileges of the elevated access token, wherein modifying the one or more access privileges of the elevated access token simultaneously modifies access privileges granted to the child access token and changed by the modification to the one or more access privileges of the elevated access token.

14. The non-transitory computer-readable medium of claim 13, storing computer executable instructions that, when executed by the one or more processors, cause the computing device to:

receive, by the synchronized content management system, access credentials and a network device identifier to request the elevated access token;

generate the elevated access token; and send the elevated access token to the network device prior to receiving the request for the child access token from the network device.

15. The non-transitory computer-readable medium of claim 13, storing computer executable instructions that, when executed by the one or more processors, cause the computing device to:

receive a first electronic device identifier along with the request for the child access token for the electronic device from the network device;

receive a second electronic device identifier from the electronic device; and determine a match between the first and second electronic device identifiers before generating the child access token for the electronic device.

16. The non-transitory computer-readable medium of claim 13, wherein modifying the one or more access privileges includes revoking a privilege to upload content items to the synchronized content management system.

17. The non-transitory computer-readable medium of claim 13, wherein the elevated access token is used only for authentication to validate a user's identify for a third-party service.

18. The non-transitory computer-readable medium of claim 13, wherein the network device is a router.

19. The non-transitory computer-readable medium of claim 13, further comprising: sending the child access token directly to the electronic device.

20. The non-transitory computer-readable medium of claim 13, wherein the one or more access privileges comprise a limited access duration associated with the child access token, the request for the child access token comprising an indication of the limited access duration for the child access token.

* * * * *